United States Patent
Ranchal et al.

(10) Patent No.: US 10,956,015 B1
(45) Date of Patent: Mar. 23, 2021

(54) USER NOTIFICATION BASED ON VISUAL TRIGGER EVENT

(71) Applicant: INTERNATIONAL BUSINESS MACHINES CORPORATION, Armonk, NY (US)

(72) Inventors: Rohit Ranchal, Cambridge, MA (US); Xu Wang, Cambridge, MA (US); Paul R. Bastide, Ashland, MA (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/567,421

(22) Filed: Sep. 11, 2019

(51) Int. Cl.
| | |
|---|---|
| *G06F 3/048* | (2013.01) |
| *G06F 3/0484* | (2013.01) |
| *H04M 1/725* | (2021.01) |
| *G06F 3/14* | (2006.01) |
| *G06F 3/0481* | (2013.01) |

(52) U.S. Cl.
CPC ........ *G06F 3/04847* (2013.01); *G06F 3/0481* (2013.01); *G06F 3/1423* (2013.01); *H04M 1/72527* (2013.01); *H04M 1/72552* (2013.01); *H04M 2201/38* (2013.01); *H04M 2201/42* (2013.01)

(58) Field of Classification Search
CPC .. G06F 3/04847; G06F 3/1423; G06F 3/0481; H04M 3/72552; H04M 1/72527; H04M 2201/38; H04M 2201/42
See application file for complete search history.

(56) References Cited

U.S. PATENT DOCUMENTS

| | | | |
|---|---|---|---|
| 8,199,891 B2 | 6/2012 | Brown | |
| 8,813,196 B2 | 8/2014 | Weller | |
| 9,641,559 B2 | 5/2017 | Maistri | |
| 10,237,160 B2 | 3/2019 | Madgwick | |
| 2009/0259926 A1* | 10/2009 | Deliyannis | G06F 16/70 715/205 |
| 2010/0222046 A1 | 9/2010 | Cumming | |
| 2012/0072583 A1 | 3/2012 | Kupferman | |

(Continued)

OTHER PUBLICATIONS

Google, "Awesome Screenshot: Screen Video Recorder", , Chrome Web Store, [accessed on Sep. 9, 2019], 7 pages, Retrieved from the Internet: <https://chrome.google.com/webstore/detail/awesome-screenshot-screen/nlipoenfbbikpbjkfpfillcgkoblgpmj?hl=en>.

(Continued)

*Primary Examiner* — Haoshian Shih
(74) *Attorney, Agent, or Firm* — Caleb D. Wilkes

(57) ABSTRACT

An embodiment of the invention may include a method, computer program product and computer system for visual trigger notification. The method, computer system, and computer program product may include a computing device which may receive a user selection of a display portion of an application on a first display unit and user input defining a visual trigger policy for the selected display portion of the application. The visual trigger policy may define a visual trigger and a user notification in response to detecting the visual trigger. The computing device may capture image data of the selected display portion of the application on the first display unit and analyze the captured image data to detect the visual trigger, The computing device may, in response to detecting the visual trigger, generate the user notification defined by the visual trigger policy.

20 Claims, 7 Drawing Sheets

(56) References Cited

U.S. PATENT DOCUMENTS

2013/0311177 A1 11/2013 Bastide
2014/0006944 A1 1/2014 Selig
2019/0166361 A1 5/2019 De La Paz

OTHER PUBLICATIONS

IBM, "About email delivery", IBM Cloud Email Delivery, Last updated Aug. 16, 2018 [accessed on Sep. 9, 2019], 2 pages, Retrieved from the Internet: <https://console.bluemix.net/docs/infrastructure/email-delivery/about.html#about-email-delivery>.
IBM, "IBM Watson Visual Recognition service", Visual Recognition—IBM Cloud API Docs, [accessed on Sep. 9, 2019], 33 pages, Retrieved from the Internet: <https://cloud.ibm.com/apidocs/visual-recognition>.
IBM, "Push Notifications", IBM Cloud, Published Sep. 6, 2019 [accessed on Sep. 9, 2019], 2 pages, Retrieved from the Internet: <https://console.bluemix.net/catalog/services/push-notifications>.
Mell et al., "The NIST Definition of Cloud Computing", National Institute of Standards and Technology, Special Publication 800-145, Sep. 2011, 7 pages.
Park, et al., "CoMon: A Mostly-Scalable Monitoring System for PlanetLab", Princeton University, [accessed on Sep. 6, 2019], 10 pages, Retrieved from the Internet: <https://www.ndsl.kaist.edu/~kyoungsoo/papers/comon_paper.pdf>.
Slack, "Whatever work you do, you can do it in Slack", Where work happens, [accessed on Sep. 9, 2019], 7 pages, Retrieved from the Internet: <https://slack.com/>.

* cited by examiner

USER NOTIFICATION BASED ON VISUAL TRIGGER EVENT

BACKGROUND

The present invention relates generally to a method, system, and computer program for user event notification. More particularly, the present invention relates to a method, system, and computer program for user notification based on a visual trigger event.

In the past few decades, the proliferation of computer technology has resulted in people being more connected to each other than ever before. This has resulted in many people having multiple devices running multiple applications and programs, all of which demand user attention. For example, a user may have a computer, a cellphone, and a smartwatch all within arm's reach and all running various applications or programs with which the user in presently interacting with. Thus, there is a constant demand for attention requiring user input from multiple sources.

BRIEF SUMMARY

An embodiment of the invention may include a method, computer program product and computer system for service animal navigation. The method, computer program product and computer system may include computing device which may receive a user selection of a display portion of an application on a first display unit and user input defining a visual trigger policy for the selected display portion of the application. The visual trigger policy may define a visual trigger and a user notification in response to detecting the visual trigger. The computing device may capture image data of the selected display portion of the application on the first display unit and analyze the captured image data to detect the visual trigger. The computing device may, in response to detecting the visual trigger, generate the user notification defined by the visual trigger policy and send the user notification to a second display unit on a second computing device.

DETAILED DESCRIPTION

Figure 1A:
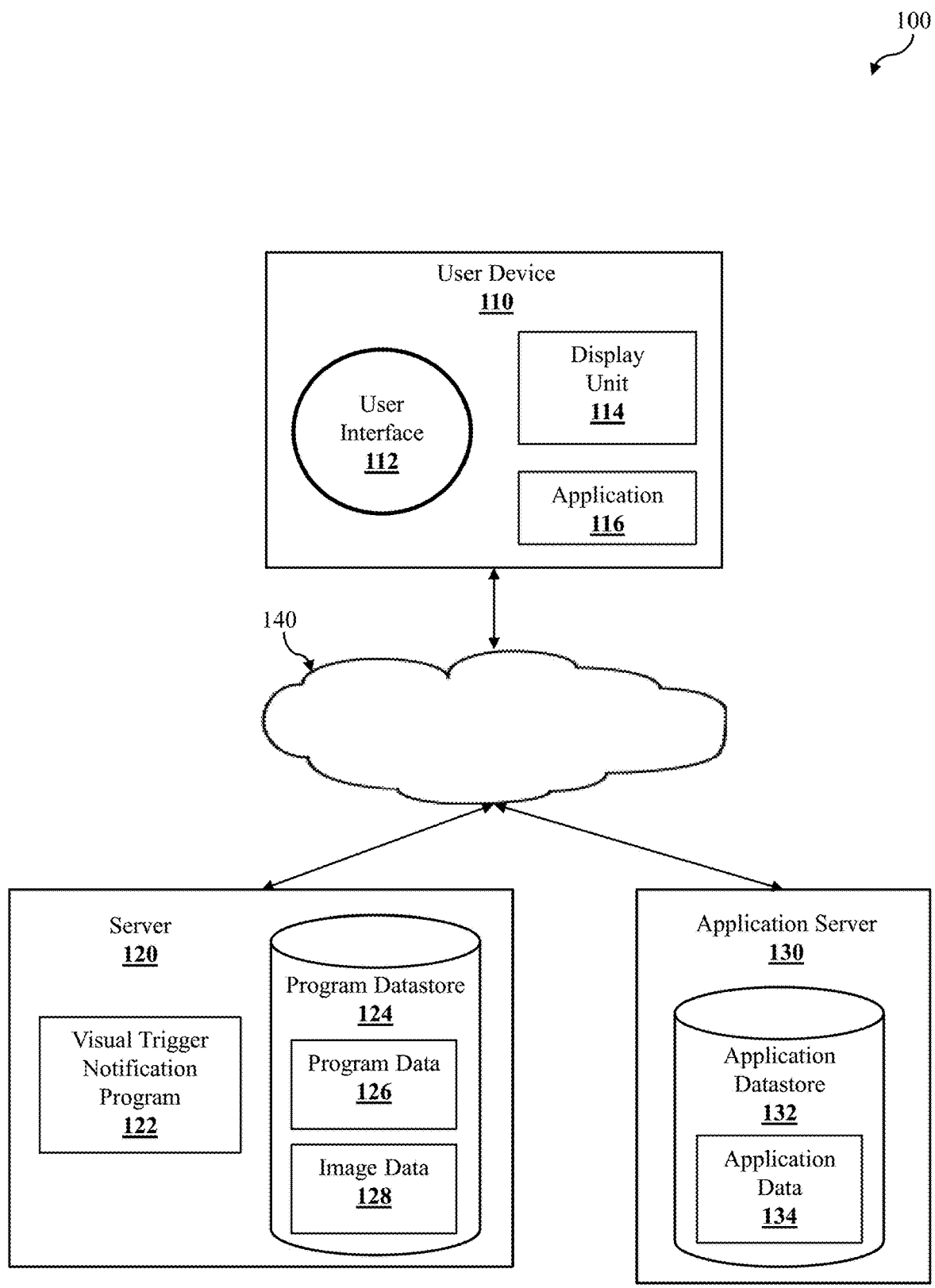
FIG. 1a illustrates a system for visual trigger notification, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for visual trigger notification. Currently, people running multiple applications and programs on one or more displays on one or more computers have to manually check or be physically on the one or more computing devices to determine when an action needs to be taken. For example, a user may have several applications running on a computer and one of the applications may be running a file download which the user wants to monitor. Current technologies may require the user constantly check the progress of the file download by physically bringing up the application, which may be running in the background while the user interacts with another application or program. Further, current technologies don't allow a user to be able to continue to monitor a specific display portion of an application while they are away from the computing device running the application. Embodiments of the present invention provide a method, computer program, and computer system to enable the selection a display portion of an application, which a user wishes to monitor and to define a visual trigger policy for that display portion of the application. Thus, embodiments of the present invention allow for the monitoring of a specific portion of an application display such as, but not limited to, a progress bar, a timer, a chat window, a summary winder, etc. The visual trigger policy of the present invention allows a user to define a specific event or action displayed by an application, i.e. a visual trigger, and a user notification (or automated user action) in response to the detection of that specific event or action. Further, embodiments of the present invention allow for sending a notification to a secondary user device once the visual trigger is detected on a first user device.

Reference will now be made in detail to the embodiments of the present invention, examples of which are illustrated in the accompanying drawings, wherein like reference numerals refer to like elements throughout. Embodiments of the invention are generally directed to a system for visual trigger notification.

FIG. 1 illustrates a visual trigger notification system 100, in accordance with an embodiment of the invention. In an example embodiment, visual trigger notification system 100 may include user device 110, server 120, and application server 130, interconnected via network 140.

In general, the network 140 can be any combination of connections and protocols that will support communications between the user device 110, the server 120, and the application server 130. The network 140 may include, for example, wired, wireless or fiber optic connections. In an example embodiment, the network 140 may be a wired or wireless personal area network (PAN). In another example embodiment, the network 140 may be the Internet, representing a worldwide collection of networks and gateways to support communications between devices connected to the Internet. In other embodiments, the network 140 may be implemented as an intranet, a local area network (LAN), or a wide area network (WAN).

The user device 110 may include the user interface 112, the display unit 114, and the application 116. In the example embodiment, the computer device 110 may be any computing device such as, but not limited to, a cellphone, a desktop computer, a notebook, a laptop computer, a tablet computer, a thin client, or any electronic device or computing system capable of storing compiling and organizing audio, visual, or textual content and receiving and sending that content to and from other computing devices, such as the server 120, and the application server 130 via the network 140. While only a single user device 110 is illustrated, it can be appreciated that any number of user devices 110 may be part of the visual trigger notification system 100. Further, while the user device 110 is illustrated separate from the server 120, it can be appreciated that the user device 110 and the server 120 may be single device. The user device 110 is described in more detail with reference to FIG. 3.

The user interface 112 includes components used to receive input from a user on the user device 110 and transmit the input to the visual trigger notification program 122, or conversely to receive information from the visual trigger notification program 122 and display the information to the user on the user device 110. The user interface 112 may include components that receive and/or transmit audio, visual, and/or textual content, such as a microphone, a speaker, or a headset having a microphone and a speaker, a keyboard, a mouse, a camera, a touchscreen, etc. Further, the user interface 112 may receive input, such as audio, visual, and/or textual input received from a physical input device, such as a keyboard, a mouse, a microphone, a camera, etc. In an example embodiment, the user interface 112 uses a combination of technologies and devices, such as device drivers, to provide a platform to enable users of user device 110 to interact with the visual trigger notification program 122.

The display unit 114 may be any visual display component capable of displaying visual content to a user of the user device 110. The display unit 114 may be a desktop computer display, a notebook display, a laptop computer display, a tablet computer display, a thin client display, a virtual display, a logical display, or any other electronic device display or computing system display capable of displaying or rendering audio, visual, or textual content and receiving and sending that content to and from other computing devices, such as the server 120, and the application server 130 via the network 140. While only a single display unit 114 is illustrated, it can be appreciated that any number of display units 114 may be part of the user device 110. Further, while the display unit 114 is illustrated as being resident within the user device 110, it can be appreciated that the display unit 114 may be separate from associated with the user device 110. For example, the display unit 114 may be a stand-alone computer monitor connected to the user device 110 via the network 140 or via a hardwire connection, such as, but not limited to, an HDMI cable, a VGA cable, USB cable, etc. The display unit 114 is described in more detail with reference to FIG. 3.

The application 116 may be any application, software, online social network, online messaging application, and/or collaboration service such as, but not limited to, video conferencing application, social media applications, email applications, and messaging applications, etc. For example, the application 116 may be, but is not limited to, Webex®, Skype®, Twitter®, Instagram®, Facebook®, IBM® Connections, Jive®, Yammer®, Microsoft Outlook®, Gmail®, Lotus Notes®, etc. In an example embodiment of the invention, the application 116 may be an application with asynchronous communication, asynchronous updates, and/or asynchronous refreshes such as, but not limited to, messaging applications or video conferencing applications. As described in the example above, the application 116 may be a social media platform such as Twitter®. In an embodiment, the application 116 may be a software management, deployment, installation, update, activation, or de-installation application, either for an individual computer or for a plurality of computers deployed in an enterprise. Thus, the visual trigger notification program 122 may use data, i.e. the application data 134a, 134b, 134c, associated with the application 116. The data associated with the application 116, i.e. the application data 134, may be stored on the application server 130. While only a single application 116 is illustrated, it can be appreciated that any number of applications 116 may reside on the user device 110. For example, a user on user device 110 may have Twitter®, Facebook®, Instagram®, and Gmail® accounts and the data, i.e. the application data 134, associated with each would be stored on the Twitter®, Facebook®, Instagram®, and Gmail® servers, i.e. the application server 130.

The server 120 may include the visual trigger notification program 122 and program datastore 124. In the example embodiment, the server 120 may be a desktop computer, a notebook, a laptop computer, a tablet computer, a thin client, or any other electronic device or computing system capable of storing compiling and organizing audio, visual, or textual content and receiving and sending that content to and from other devices, such as the user device 110, and the application server 130, via the network 140. In some embodiments, the server 120 includes a collection of devices, or data sources, in order to collect the program data 126. While only a single server 120 is illustrated, it can be appreciated that any number of servers 120 may be part of the visual trigger notification system 100. Further, while the server 120 is illustrated separate from the user device 110, it can be appreciated that the server 120 and the user device 110 may be single device. The server 120 is described in more detail with reference to FIG. 3.

The visual trigger notification program 122 is a program capable of receiving a visual trigger policy for a portion of a display, monitoring the portion of the display for the visual trigger defined by the visual trigger policy and notifying a user in response to detecting the defined visual trigger in accordance with the defined visual trigger policy. The visual trigger notification program 122 is described in more detail below with reference to FIG. 1b. In various embodiments, all or part of the visual trigger notification program 122 may be installed and run on the user device 120.

The program datastore 124 may include program data 126 and image data 128. The program datastore 124 may be any storage media capable of storing and managing data, such as, but not limited to, storage media resident in the server 120 and/or removeable storage media. For example, the program datastore 124 may be, but is not limited to, a hard drive, a solid stated drive, a USB drive, or a memory card, etc. The program data 126 may include, but is not limited to, audio, visual, and textual data. The program data 126 may be a collection of data collected and/or created by the visual trigger notification program 122 including, but no limited to, display data from the user device 110, visual policies, and the application data 134 collected from the application server 130. The image data 128 may include, but is not limited to audio, visual, and textual data. The image data 128 may be a collection of data collected and/or created by the visual trigger notification program 122 including, but no limited to, video collected from the user device 110, and images collected from the user device 110. The program datastore 124 located on the server 120 may be accessed through the network 140. In various embodiments, all or part of the program datastore 124 may be installed and run on the user device 120. The program datastore 124 is described in more detail with reference to FIG. 3.

The application server 130 may include the application datastore 132. While only a single application server 130 is illustrated, it can be appreciated that any number of application servers 130 may be part of the visual trigger notification system 100. In the example embodiment, the application server 130 may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 110, and the server 120, via the network 140. In some embodiments, the application server 130 may include a collection of devices or data sources. The application server 130 is described in more detail with reference to FIG. 3.

The application datastore 132 may include the application data 134 associated with the application 116 including, but not limited to, audio, visual, and textual files. For example, the application data 134 may include social media feeds, online messages, emails, tweets, and software program data, etc. The application datastore 132 may be any storage media capable of storing data capable of storing data, such as, but not limited to, storage media resident in the application datastore 132 and/or removeable storage media. For example, the application datastore 132 may be, but is not limited to, a hard drive, a solid stated drive, a USB drive, or a memory card, etc. The application datastore 132 located on the application server 130 may be accessed through the network 140. The application datastore 132 is described in more detail with reference to FIG. 3.

Figure 1B:
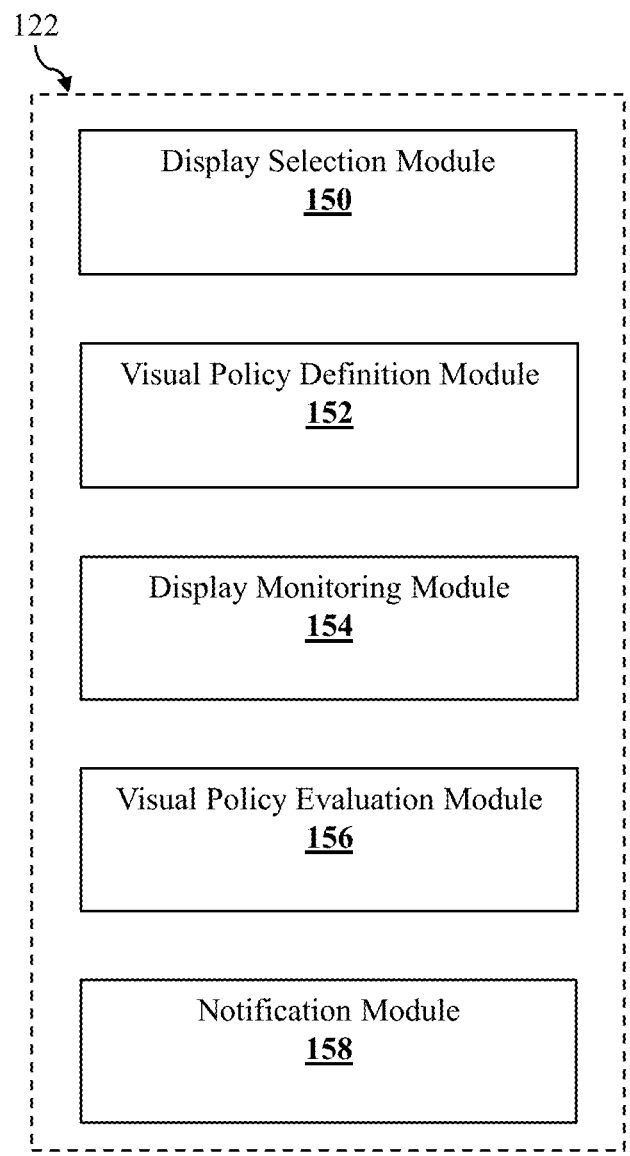
FIG. 1b illustrates example operating modules of the visual trigger notification program of FIG. 1a, in accordance with an embodiment of the invention.

Referring to FIG. 1b, example modules of the visual trigger notification program 122 are illustrated. In an example embodiment, the visual trigger notification program 122 may include five modules: the display selection module 150, the visual policy definition module 152, the display monitoring module 154, the visual policy evaluation module 156, and the notification module 158.

Figure 1C:
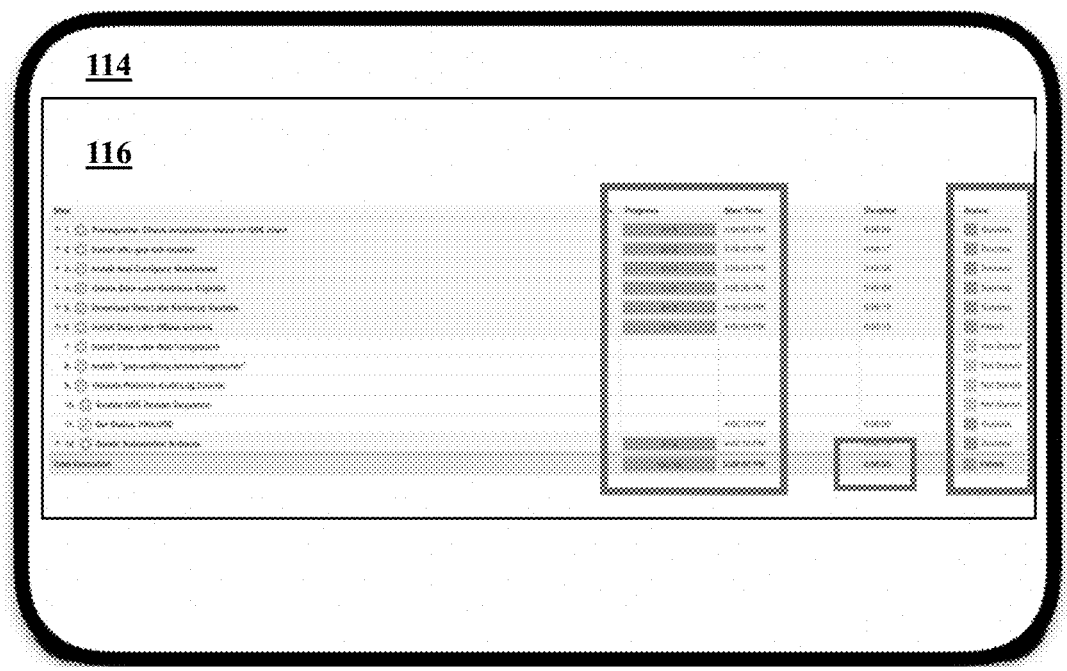
FIG. 1c illustrates an example of user display portion selection, in accordance with an embodiment of the invention.

The display selection module 150 allows a user to select a portion of the display of the application 116 on the display unit 114 which the user wishes to monitor. For example, a user may have the application 116 open on the user device 110 and the application 116 may be running a software deployment job which takes a significant amount of time to complete (e.g., an hour or more) and the user may want to leave the computer device 110 for a period of time and wish to monitor the progress of the deployment while away. In addition, in some embodiments, the user may want to define certain actions to be automatically taken in response to a deployment progress update such as, but not limited to, ending a download, re-starting a download, re-starting the user device 110, terminating an application, re-starting an application, etc. Continuing with the previous example, the user may select, for example, but not limited to, a portion of the display unit 114 on the user device 110 that indicates the progress and/or status of the software deployment job of the application 116. For example, as shown in FIG. 1c, the user may select a portion of the application 116 on the display unit 114 such as, but not limited to, a progress bar, a countdown clock, and/or a status box, etc. The user may select the display portion of the application 116 using an external device, such as, but not limited to, a mouse, a digital pen, etc. The user may also use gestures to select the display portion of the application 116 such as, but not limited to, a pinch-zoom, or finger swipe, etc. when the display unit is a touchscreen. In embodiments of the invention, a user may select more than one portion of the display unit 114 as shown in FIG. 1c. For example, but not limited to, the application 116 may display multiple columns and rows, e.g. a spreadsheet, and the user may select various columns, rows, and/or cells to be monitored. Further, depending on the application 116, the user may select a display portion of the application 116 on the display unit 114 based on shape, such as, but not limited to, a 2-dimensional area/object or 3-dimensional area/object. In an example embodiment of the invention, a user may have multiple applications 116 open at the same time on the user device 110 and wish to monitor activity on one of the applications 116, which may be minimized, pushed behind one or more active windows of or more other applications, or run in the background while the user may use another of the applications 116. Thus, while one of applications 116 is currently displayed, a user may select the portion of the display unit 114 corresponding to a particular display area of one of the applications, designating it to be monitored by the visual trigger notification program 122. If the application 116, is subsequently resized, the display selection module 150 may adjust the user selected portion of the display unit 114 in proportion to the resizing of the application 116.

The visual policy definition module 152 defines a visual trigger policy for a selected display portion of the application 116 on the display unit 114 of the user device 110. The visual trigger policy may include a visual trigger to be detected on the selected display portion of the application 116 on the display unit 114 and a user notification to be generated in response to detecting the visual trigger. The visual trigger may be for example, but not limited to, a color change, e.g. from red to green, a set run time threshold, e.g. 1 hour, progress bar percentage, e.g. 100%, text change, e.g. "in progress" to "complete," or a view change, e.g. video of a conference host to a displayed presentation, etc. In an example embodiment of the invention, the visual trigger is an asynchronous trigger, i.e. a trigger that happens randomly or intermittently and not at a scheduled time or pace. For example, a user on the user device 110 may be downloading a file and wish to monitor the progress of the download, which could take a varying amount of time depending on the file size and network speed; thus, the user may select the progress bar from the download window on the display unit 114 and set a visual trigger policy where the visual trigger is the progress bar reaching 100%. As another example, a user may be attending a video conference and wish to be notified when the scheduled meeting begins so that the user may remain engaged; thus, the user may select the display window of the video conferencing application and set a visual trigger policy where the visual trigger is when video feed for the meeting begins, e.g. goes from a blank screen to an active video feed. It may be appreciated that the user may define one or more visual triggers for the same selected portion of the display in the visual trigger policy. For example, the user may want to be notified if the download has stalled, exceeded a time threshold, and/or completed, etc. The user notification may be for example, but not limited to, a text message to another user device 110, a pop-up notification on the user device 110, an e-mail notification, an audio notification on the user device 110, e.g. an alarm, etc. Further, the user notification may be defined to include for example, but not limited to, a summary of the monitored activity or a visual replay of the activity, e.g. a screenshot or a video clip, etc. The visual trigger policy, as described above, may be defined as a triplet such as, but not limited to, <area, change, action>. For example, a user may wish to monitor three different selected areas of the application 116, e.g. Box1, Box2, and Box3, on the display unit 114 and the visual trigger policy triplet may be defined as follows: <Box1, if (color=red), generate notification>; <Box2, if (time>01:30:00), generate notification>; and <Box3, if (color=red or color=grey), generate notification>.

The display monitoring module 154 captures the image data 128 from the selected display portion of the application 116 on the display unit 114. The display monitoring module 154 may capture the image data 128 by, for example, but not limited to, capturing continuous screenshots of the selected display portion, capturing screenshot of the selected display portion at pre-determined intervals (e.g. every second, every 30 seconds, every minute, etc.) or continuously recording the selected display portion, etc. The display monitoring module 154 may utilize application specific application programming interfaces (APIs) or various known screen recording applications/technologies to capture the image data 128. In an embodiment of the invention, the application 116 being monitored by the visual trigger notification program 122 may be minimized or running in the background of the display unit 114 and the display monitoring module 154 may flip the active screen(s) on the display unit 114 to the background in order to capture the image data 128, i.e. the selected display portion of the application 116. The display monitoring module 154 may flip the active display to the background for example, but not limited to, at pre-defined time intervals, when the user's eyes are not focused on the display unit 114 based on video analysis, etc. Further, display monitoring module 154 may bring the application 116 to the foreground on a secondary display unit 114 such as, but not limited to, a secondary monitor connected to the user device 110. In further embodiments of the invention, the display monitoring module 154 may monitor the display portion of the application 116 on a display unit 114 that is out-of-view of the user such as, but not limited to, a virtual display, or a logical display.

The visual policy evaluation module 156 analyzes the image data 128 to determine if the visual trigger defined in the visual trigger policy has occurred. The visual policy evaluation module 156 may utilize various known visual recognition technologies and natural language processing technologies such as, but not limited to, IBM Watson™ Visual Recognition service, or IBM Watson™ Natural Language Understanding service in order to determine if the visual trigger defined in the visual trigger policy has occurred. The IBM Watson™ Visual Recognition service uses deep learning algorithms to identify scenes, objects, and faces in images in order to identify specific user defined objects. For example, the visual policy evaluation module 156 may analyze the image data 128 captured from the display unit 114 for the application 116 to determine if the progress bar for a download has reached 100%. The IBM Watson™ Natural Language Understanding service analyzes various features of text content at scale to extract meaning from the text. For example, the visual policy evaluation module 156 may analyze the image data 128 captured from the display unit 114 for the application 116 to determine if there is a text change, e.g. a download status changing from "in progress" to "complete."

The notification module 158 generates the user notification defined in the visual trigger policy in response to detecting the visual trigger defined in the visual trigger policy. The user notification, as described above, may be for example, but not limited to, a short message service (SMS) message, i.e. a text message, a pop-up notification on the user device 110, a push notification, an e-mail notification, an audio notification, e.g. an alarm, etc. The user notification module 158 may send the generated user notification to the user device 110 (a first computing device) running the application 116 or to another user device 110 (a second computing device). For example, the user may define a visual trigger policy for an application running on a home computer and define a user notification to be sent to their cellphone. The user notification module 158 may generate the user notification utilizing APIs or known notification/alerting services and technologies such as, but not limited to, IBM® Cloud Email Delivery, IBM® Push Notifications, and Slack®, etc. Further, the user notification may include for example, but not limited to, a summary of the monitored activity or a visual replay of the activity, e.g. a screenshot or a video clip, etc. For example, the user notification may include the screenshot from the image data 128 containing the defined visual trigger, or a video clip showing the visual trigger happening, a re-playable summary thumbnail, etc.

Figure 2:
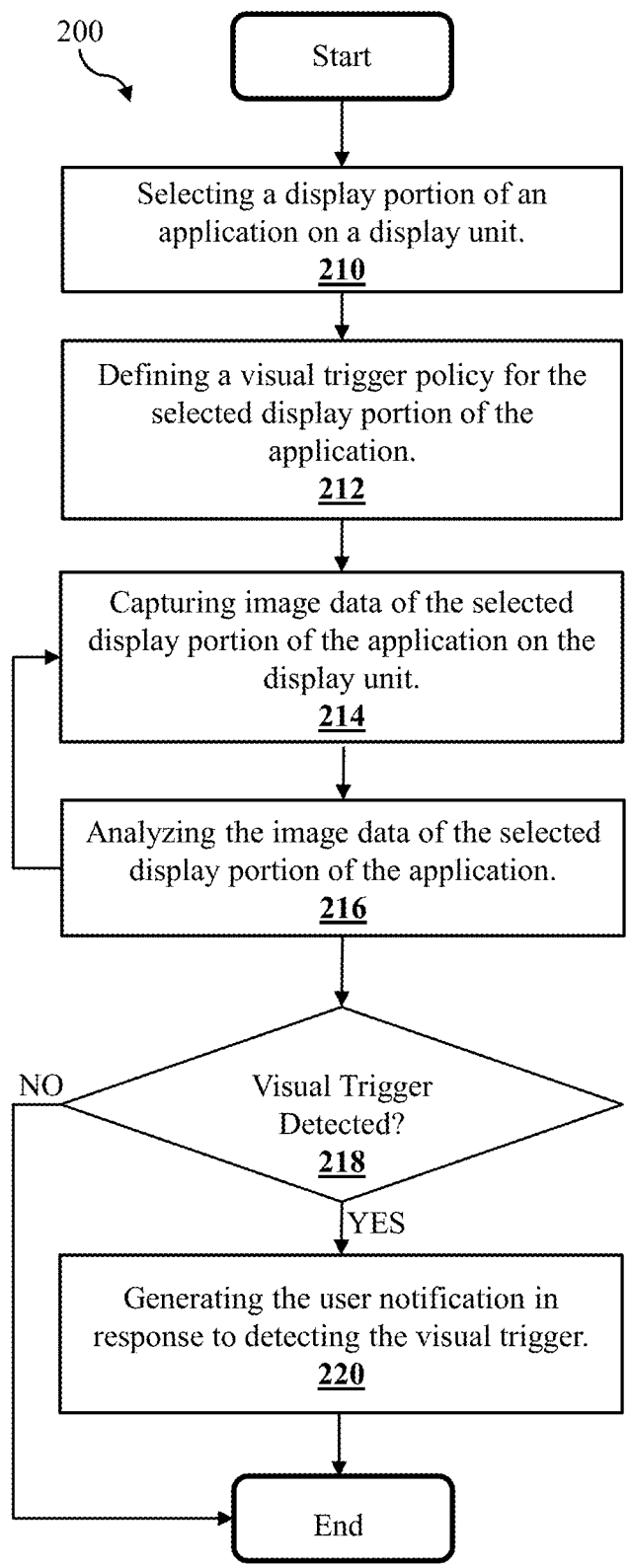
FIG. 2 is a flowchart illustrating an example method of the visual trigger notification system, in accordance with an embodiment of the invention.

Referring to FIG. 2, a method 200 for visual trigger notification is depicted, in accordance with an embodiment of the present invention.

Referring to block 210, the visual trigger notification program 122 receives a user selection of a display portion of the application 116 on the display unit 114. Display portion selection is described in more detail above with reference to the display selection module 150.

Referring to block 212, the visual trigger notification program 122 receives a user defined visual trigger policy for a selected display portion of the application 116 on the display unit 114 of the user device 110. The visual trigger policy may include a visual trigger to be detected on the selected portion of the display unit 114 and a user notification to be generated in response to detecting the visual trigger. Visual trigger policy definition is described in more detail above with reference to the visual trigger policy definition module 152.

Referring to block 214, the visual trigger notification program 122 captures the image data 128 from the selected display portion of the application 116 on the display unit 114. Image data capture is described in more detail above with reference to the display monitoring module 154.

Referring to block 216, the visual trigger notification program 122 analyzes the image data 128 to determine if the visual trigger defined in the visual trigger policy has occurred. Image data analyzation is described in more detail above with reference to the visual policy evaluation module 156.

Referring to block 218, the visual trigger notification program 122 determines if the visual trigger defined in the visual trigger policy has occurred. If the visual trigger has not been detected, the visual trigger notification program 122 may repeat blocks 214-216 until the visual trigger is detected. If the visual trigger is detected, the visual trigger notification program 122 may proceed to block 220. Visual trigger detection is described in more detail above with reference to the visual policy evaluation module 156.

Referring to block 220, the visual trigger notification program 122 generates the user notification defined in the visual trigger policy in response to detecting the visual trigger defined in the visual trigger policy. User notification is described in more detail above with reference to the notification module 158.

Figure 3:
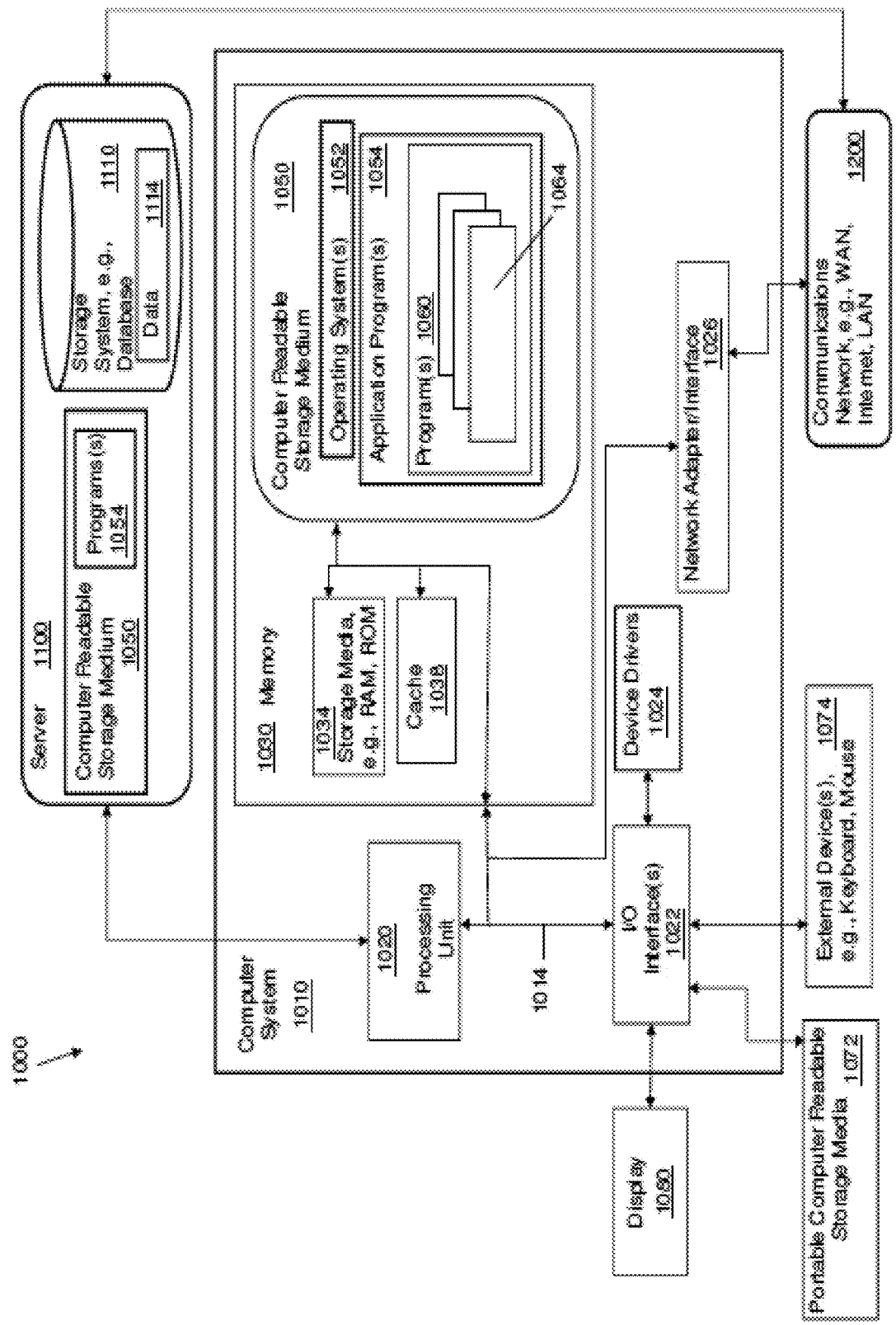
FIG. 3 is a block diagram depicting the hardware components of the visual trigger notification system of FIG. 1, in accordance with an embodiment of the invention.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program(s) 1060 and can be stored in memory 1030 in the computer readable storage medium 1050. For example, the program 1060 can include the modules 150-158 described above with reference to FIG. 1b. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
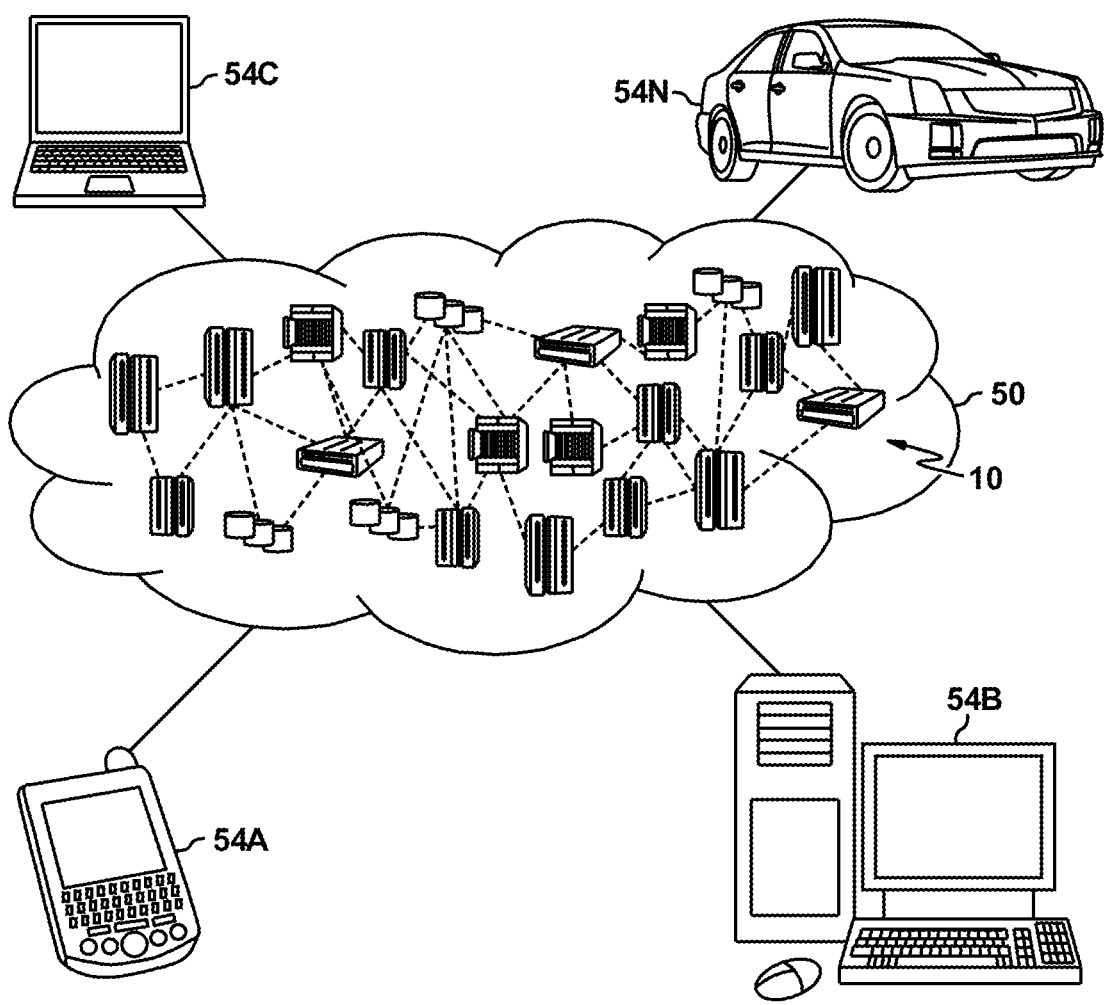
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
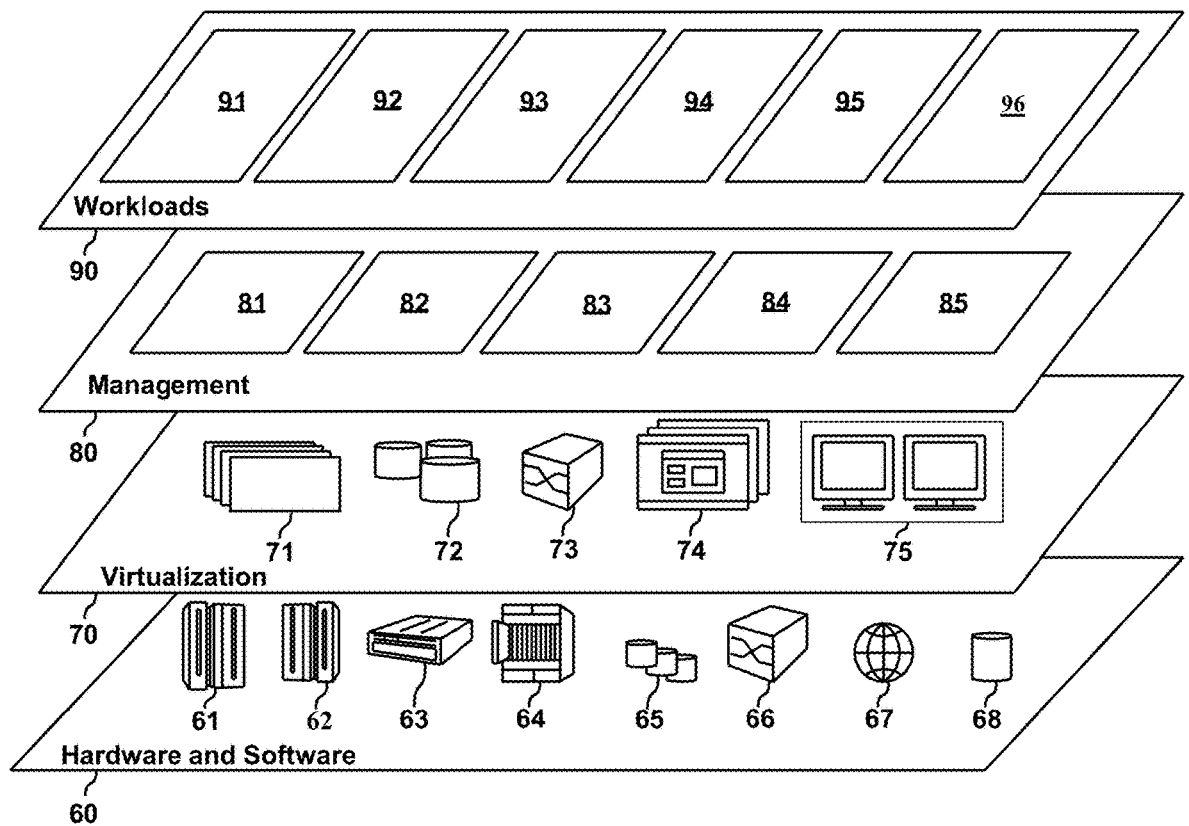
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visual trigger notification 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for visual trigger notification, the method comprising:
   receiving, by a first computing device, a user selection of a display portion of an application on a first display unit;

receiving, by the first computing device, user input defining a visual trigger policy for the selected display portion of the application, the visual trigger policy defining a visual trigger and a user notification in response to detecting the visual trigger;

capturing, by the first computing device, image data of the selected display portion of the application on the first display unit;

analyzing, by the first computing device, the captured image data to detect the visual trigger; and in response to detecting the visual trigger, generating, by the first computing device, the user notification defined by the visual trigger policy.

2. The method of claim 1, wherein generating, by the first computing device, the user notification defined by the visual trigger policy, further comprises:

sending, by the first computer device, the user notification to a second display unit on a second computing device.

3. The method of claim 1, wherein the display portion of the application on the first display comprises at least one of the group consisting of: a progress bar, a timer, a chat window, or a summary window.

4. The method of claim 1, wherein the visual trigger comprises at least one of the group consisting of: a color change, a progress bar percentage, a defined time interval, or a text change.

5. The method of claim 1, wherein the visual trigger policy defines more than one visual trigger and more than one corresponding user notifications in response to detecting the more than one visual triggers.

6. The method of claim 1, wherein the user notification comprises at least one of the group consisting of: a pop-up notification, a push notification, an SMS message, or an email.

7. The method of claim 1, wherein the user notification includes the image data associated with the detected visual trigger.

8. A computer program product for visual trigger notification, the computer program product comprising:

a computer-readable storage medium having program instructions embodied therewith, wherein the computer readable storage medium is not a transitory signal per se, the program instructions executable by a computer to cause the computer to perform a method, comprising:

receiving, by a first computing device, a user selection of a display portion of an application on a first display unit;

receiving, by the first computing device, user input defining a visual trigger policy for the selected display portion of the application, the visual trigger policy defining a visual trigger and a user notification in response to detecting the visual trigger;

capturing, by the first computing device, image data of the selected display portion of the application on the first display unit;

analyzing, by the first computing device, the captured image data to detect the visual trigger; and in response to detecting the visual trigger, generating, by the first computing device, the user notification defined by the visual trigger policy.

9. The computer program product of claim 8, wherein generating, by the first computing device, the user notification defined by the visual trigger policy, further comprises:

sending, by the first computer device, the user notification to a second display unit on a second computing device.

10. The computer program product of claim 8, wherein the display portion of the application on the first display comprises at least one of the group consisting of: a progress bar, a timer, a chat window, or a summary window.

11. The computer program product of claim 8, wherein the visual trigger comprises at least one of the group consisting of: a color change, a progress bar percentage, a defined time interval, or a text change.

12. The computer program product of claim 8, wherein the visual trigger policy defines more than one visual trigger and more than one corresponding user notifications in response to detecting the more than one visual triggers.

13. The computer program product of claim 8, wherein the user notification comprises at least one of the group consisting of: a pop-up notification, a push notification, an SMS message, or an email.

14. The computer program product of claim 8, wherein the user notification includes the image data associated with the detected visual trigger.

15. A system for visual trigger notification, the system comprising:

a computer system comprising, a processor, a computer readable storage medium, and program instructions stored on the computer readable storage medium being executable by the processor to cause the computer system to:

receive, by a first computing device, a user selection of a display portion of an application on a first display unit;

receive, by the first computing device, user input defining a visual trigger policy for the selected display portion of the application, the visual trigger policy defining a visual trigger and a user notification in response to detecting the visual trigger;

capture, by the first computing device, image data of the selected display portion of the application on the first display unit;

analyze, by the first computing device, the captured image data to detect the visual trigger; and in response to detecting the visual trigger, generating, by the first computing device, the user notification defined by the visual trigger policy.

16. The system of claim 15, wherein generating, by the first computing device, the user notification defined by the visual trigger policy, further comprises:

sending, by the first computer device, the user notification to a second display unit on a second computing device.

17. The system of claim 15, wherein the display portion of the application on the first display comprises at least one of the group consisting of: a progress bar, a timer, a chat window, or a summary window.

18. The system of claim 15, wherein the visual trigger comprises at least one of the group consisting of: a color change, a progress bar percentage, a defined time interval, or a text change.

19. The system of claim 15, wherein the visual trigger policy defines more than one visual trigger and more than one corresponding user notifications in response to detecting the more than one visual triggers.

20. The system of claim 15, wherein the user notification comprises at least one of the group consisting of: a pop-up notification, a push notification, an SMS message, or an email.

* * * * *